United States Patent [19]

Warner

[11] 4,364,324
[45] Dec. 21, 1982

[54] STRUT RELEASE MECHANISM FOR HYDROFOIL CRAFT

[75] Inventor: Gary J. Warner, Issaquah, Wash.

[73] Assignee: The Boeing Company, Seattle, Wash.

[21] Appl. No.: 258,877

[22] Filed: Apr. 29, 1981

[51] Int. Cl.³ .............................................. B63B 1/28
[52] U.S. Cl. ................................ 114/280; 244/102 R; 403/2; 114/282
[58] Field of Search .................. 440/56; 244/102 R; 403/2, 337; 114/279, 282, 280, 281, 271, 274

[56] References Cited

U.S. PATENT DOCUMENTS

| | | | |
|---|---|---|---|
| 2,084,862 | 6/1937 | Moser | 403/337 |
| 2,309,238 | 1/1943 | Corey | 403/2 |
| 3,910,215 | 10/1975 | Soderman | 114/282 |
| 3,967,906 | 7/1976 | Strizki | 403/2 |
| 4,087,062 | 5/1978 | Masclet | 244/102 R |

Primary Examiner—Trygve M. Blix
Assistant Examiner—D. W. Keen
Attorney, Agent, or Firm—Thomas H. Murray

[57] ABSTRACT

A strut release mechanism for the forward strut of a hydrofoil craft will predictably fail when the strut experiences a predetermined impact. The failure occurs about a horizontal axis so that the strut follows a predetermined path while separating from the craft and thereby avoids impact damage to the strut or to the craft. Shear failure and tension failure structures are disclosed.

13 Claims, 13 Drawing Figures

STRUT RELEASE MECHANISM FOR HYDROFOIL CRAFT

BACKGROUND OF THE INVENTION

1. Field of the Invention

This invention relates to improvements to hydrofoil craft and particularly to an improved forward strut connection which will predictably fail on predetermined impact and separate from the vessel in a controlled manner along a predetermined arcuate path.

2. Description of the Prior Art

Hydrofoil crafts are waterborne vessels which can move through water in a hull-borne mode similar to a conventional boat and in a foil-borne mode wherein the hull is carried above the water supported on foils which depend from the hull and extend generally horizontally to the surface of the water and develop lift forces in the water similar to those developed by airplane wings in air. The hydrofoil craft foils are carried on struts which are secured to the frame of the vessel and extend downwardly, generally vertically, during the foil-borne operation of the craft. During hull-borne operation of the craft, the struts are pivoted forwardly or aftwardly in most cases for protection of the water foil and to reduce water resistance of the strut and foil assembly.

When the hydrofoil craft is operated in its foil-borne mode, the vessel develops extremely high speed in comparison to conventional ship speeds. At these high speeds, safety problems arise because of the possibility that the rapidly moving strut and foil will strike large debris or other floating or submerged articles such as large driftwood, large animals such as whales, large mantas and the like, or other floating or submerged objects. Such impacts, occurring at the high speeds of hydrofoil craft operation, can cause serious damage to the hull of the hydrofoil craft and to the strut and foil assembly. The shock of rapid deceleration of the hydrofoil craft may be dangerous to passengers and crew members on board the craft. Serious structural damage may occur to the frame of the hull. If the strut and foil assembly is damaged, the hydrofoil craft can continue its voyage as a water-borne vessel and can be repaired at the end of the voyage.

In the U.S. Pat. No. 3,910,215, the forward hydrofoil strut is restrained in its foil-borne position by a mechanical support which is designed to rupture upon predetermined impact loads to permit the strut and foil assembly to pivot about the normal retraction pivot axis and assume rotation to a position which is opposite that of the water-borne mode. The aftward rotation of the foil, however, alters the lifting pressure and in fact reverses the lifting pressure causing a downward pressure to be applied to the hull of the hydrofoil craft. The downward pressure results in rapid accelerations and displacements with respect to the passengers and crew members.

In order to assure positive and certain release of the foil and strut assembly before any damaging stresses are applied to the hydrofoil hull, several designs have employed a pyrotechnic device which detonates and severs the strut when the strut experiences a pre-established impact. However, such detonation devices have not proved to be popular.

Thus there exists a need in hydrofoil craft development for a positive means for separating the forward strut and foil assembly of a hydrofoil craft from the hull before any damaging energy can be absorbed by the craft and its occupants, and for a controlled separation path for the strut as it separates from the craft.

STATEMENT OF THE INVENTION

A forward strut of a hydrofoil craft is secured to a steerable king post element of the craft by a connection means which will rupture when exposed to pre-established impact loads. A horizontal pivot member is included within the connection means to direct the path along which the strut will move during separation. The horizontal pivot member defines a horizontal axis which is different from the axis about which the sub-assembly of king post, strut and foil is pivoted as the foil is moved from an inactive hull-borne position to an active foil-borne position with respect to the hydrofoil craft.

In one embodiment, the strut is secured to the king post by means of bolts connecting a king post flange and a strut flange. In this embodiment rupture occurs through tension failure of bolts. In an alternative embodiment, one of the elements, king post or strut, is provided with fork arms which support a pivot member. The other member (king post or strut) has a corresponding pair of fork arms with a U-shaped groove bearing against the pivot member. The fork arms of one element are engaged with the fork arms of the other element along two abutment planes. The engaged fork arms have one or more horizontally presented shear connectors which will rupture by shearing when the strut experiences a pre-established load.

A further embodiment of the invention provides for connecting members of predetermined cross-sectional area between the strut and the king post which may be provided in a special unit or may be provided in the form of welds between portions of the engaging surfaces of the king post and strut member. These connecting members rupture in tension when the strut experiences a predetermined impact load.

DESCRIPTION OF THE PREFERRED EMBODIMENTS

Figure 1:
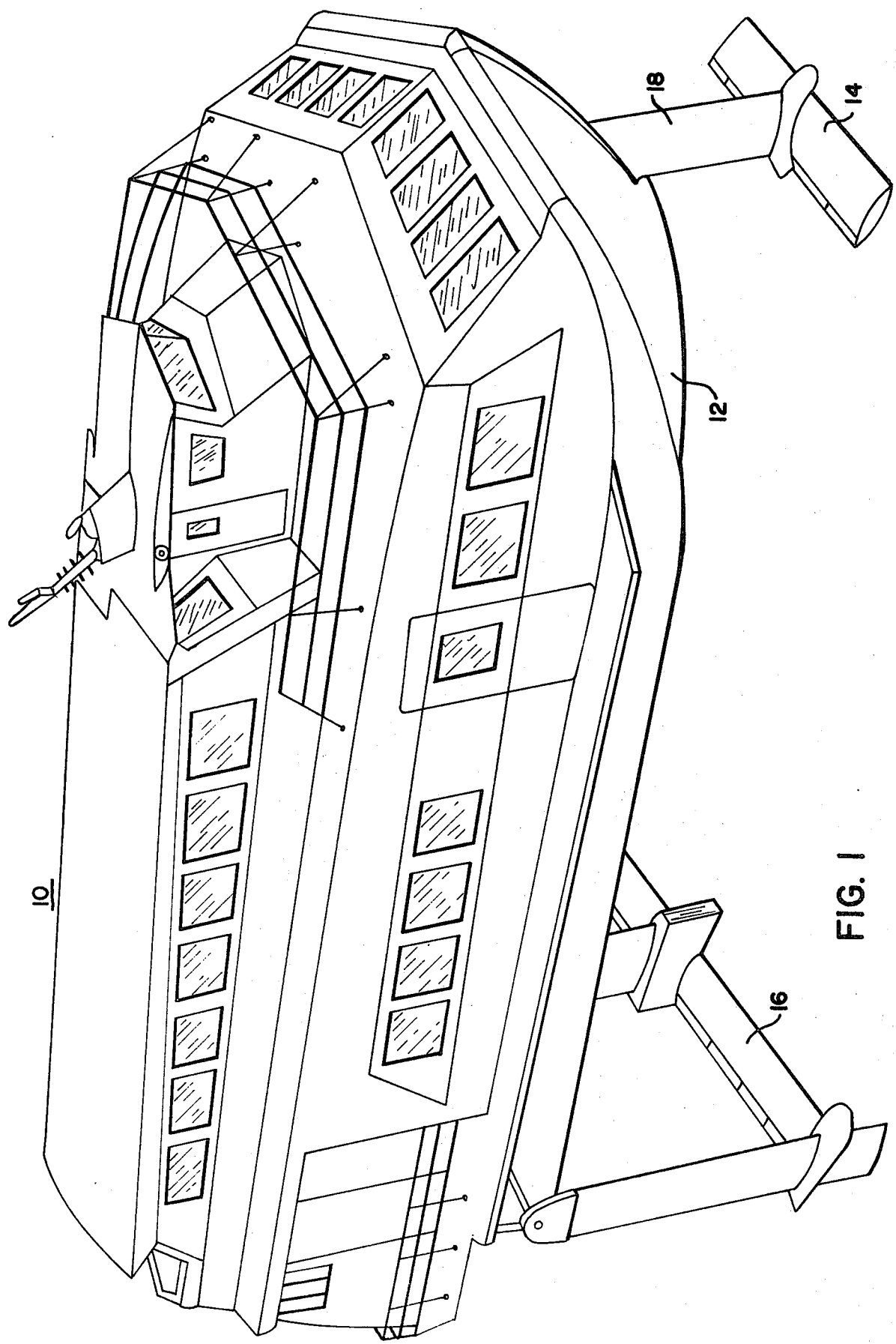
FIG. 1 is a perspective illustration of a typical hydrofoil craft.
Figure 2:
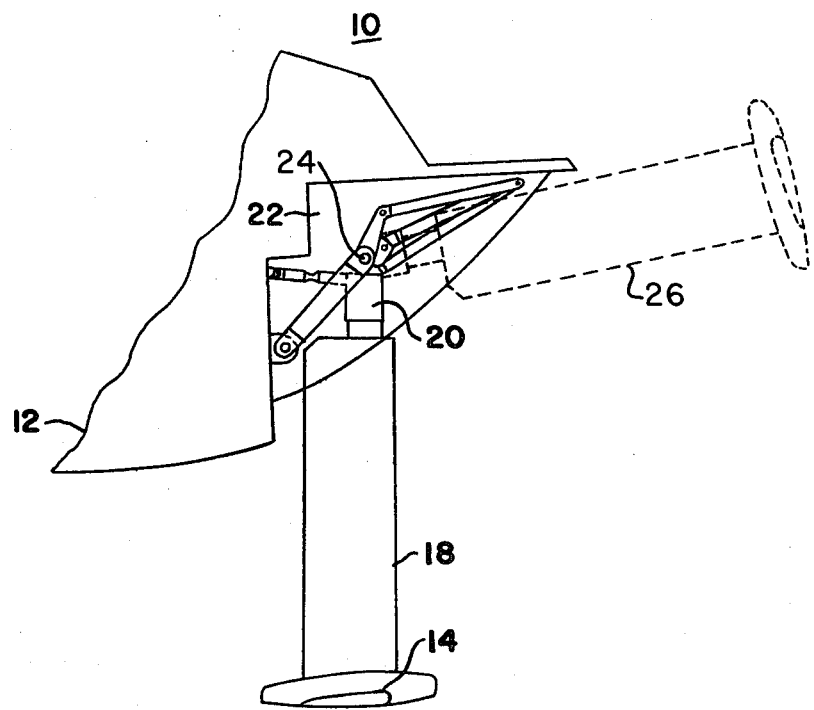
FIG. 2 is a cross-sectional illustration of the forward portion of a typical hydrofoil craft illustrating a strut and foil assembly.

The invention is shown in an illustrative embodiment in a hydrofoil craft 10 as shown in FIG. 1. The craft 10 has a hull 12 and a superstructure which is not related to the present invention. The hydrofoil craft 10 has a forward foil 14 and an aft foil 16. The forward foil 14 is secured to the forward strut 18 which is in turn secured to a steerable king post 20 as shown in FIG. 2 wherein the strut 18 and foil 14 constitute a sub-assembly in an operating position, i.e., in a position wherein the hydrofoil craft 10 can become foil-borne with the hull 12 moving in the air above water level. As further shown in FIG. 2, appropriate linkage 22 is provided for pivoting the king post 20 and the strut 18 as a sub-assembly about a pivot axis 24 from the operating position as shown in FIG. 2 to a non-operating position 26 as shown in phantom outline in FIG. 2. The mechanical linkage 22 forms no part of the present invention.

The present invention is concerned with improved connections between the forward strut 18 and the steerable king post 20 which will permit the strut 18 to separate away from the hull/king post 12/20 in a predetermined path when the strut 18 receives a predetermined impact load.

Figure 3:
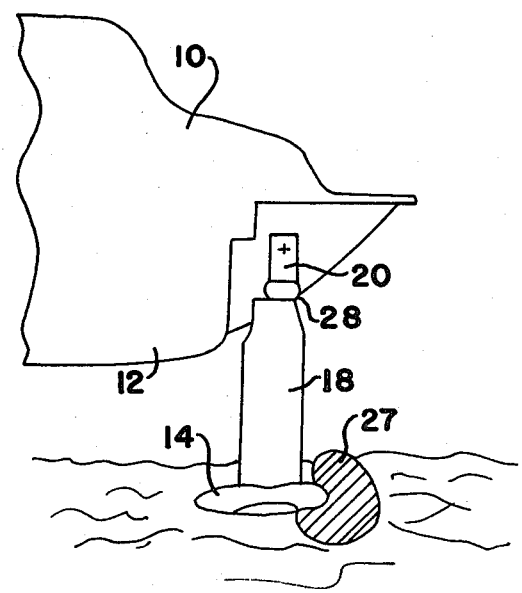
FIG. 3 is a cross-sectional illustration similar to FIG. 2 showing a strut and foil assembly connected to a king post in the manner of the present invention.

Referring to FIG. 3, the hydrofoil craft in its foil-borne mode may impact floating or submerged bodies 27 which can cause mechanical damage to the forward foil 14, to the forward strut 18, and more importantly, can create mechanical shock which is transmitted through the forward strut 18 into the framework of hull 12, which creates serious hazards for the passengers and crew members. The objective of the present invention is to arrange an improved connection 28 between the sub-assembly of forward strut 18 and forward foil 14 and the king post 20.

The improved connection 28 is intended to rupture when the impact from the submerged body 27 exceeds a pre-established level. The craft 10 is designed to withstand small impacts such as contacts with small fish and small driftwood.

After the improved connection 28 ruptures, it is a further objective of this invention that the forward strut 18 will follow a pre-established path as it separates away from the king post 20 so that the forward strut 18 does not impact the hull 12 and cause mechanical damage to the strut 18, the forward foil 14 or the hull 12. The strut 18 will be loosely tethered to the hull 12 by means of a chain or cable (not shown) so that the strut 18 can be salvaged for re-use.

It is understood that following separation of the strut 18, the hydrofoil craft 10 will settle into the water and for the remainder of the voyage the hull 12 will be water-borne.

In the present invention, the improved connection 28 includes a pivot member which establishes a pivot axis to define the path which the strut 18 will follow upon separation from the king post 20. The improved connection 28 further includes one or more mechanical connection means which will predictably fail upon application of pre-establishd loads. The mechanical connection means may be vertically presented in which case they will fail in tension, or they may be horizontally presented in which case they will fail in shear.

Figure 5:
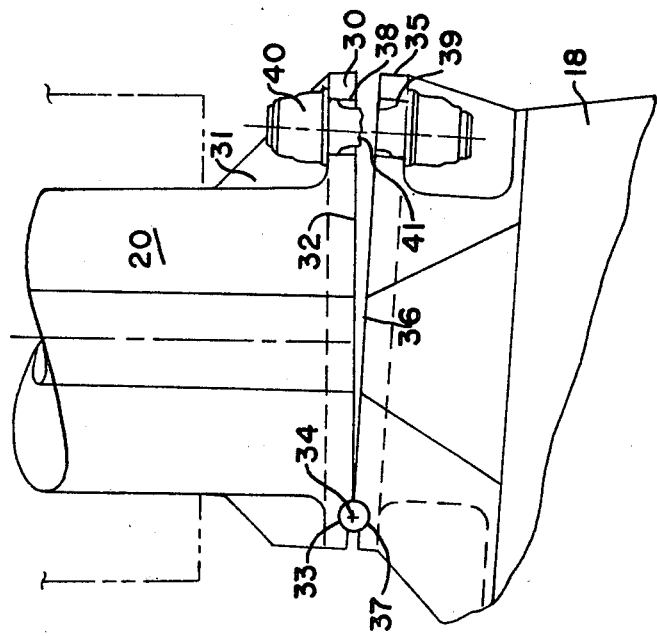
FIG. 5 is a side elevation view of the flange connection of FIG. 4 taken along the line 5—5.
Figure 4:
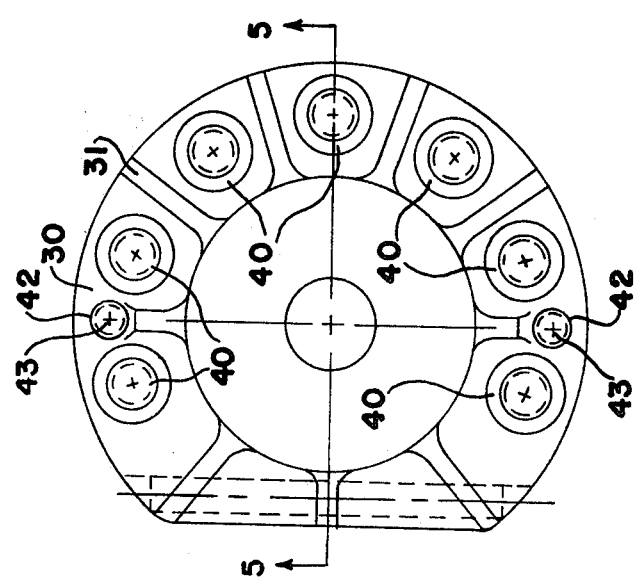
FIG. 4 is a plan view of one embodiment of the present invention showing a flange connection between a king post and a strut and foil assembly.

Referring to FIGS. 4 and 5, vertical connectors are employed which will fail in tension. The king post 20 terminates in a bottom flange 30 extending outwardly from the king post 20 and containing reinforcement fillets 31, and a bottom smooth surface 32 which has a groove 33 along one edge for receiving a pivot member 34. Similarly, the top of the strut 18 has a top flange 35 with a flat upper surface 36 having a groove 37 to receive the same pivot member 34. The pivot member 34 defines a pivot axis which is generally horizontal and is generally normal to the longitudinal axis of the craft. The top surface 36 corresponds to the bottom surface 32. The flanges 30, 35 have aligned bores 38, 39, respectively, for receiving tension fasteners 40 such as bolts which have a carefully selected minimum cross-sectional diameter as shown at 41 to establish the tension failure load of the tension fasteners 40. A sufficient number of the tension fasteners 40 is provided (FIG. 4) to secure the strut 18 to the king post 20. Additional holes 42 are provided through the flange 30 and aligned with corresponding holes (not shown) in the flange 35 to receive connector pins 43 to provide additional alignment of the overall connection and to resist lateral stress.

In FIG. 5, the flanges 30, 35 are illustrated at the instant after a strut impact, sufficient to fracture the tension fastener 40. All of the fasteners 40 (FIG. 4) will correspondingly fail and the flange 35 will separate from the flange 30. The separation occurs as a pivotal movement of the strut 18 about the pivot member 34. Thus the path of movement of the separated strut 18 will be defined by the pivot member 34 until the strut 18 has moved into a position where the impact energy transmitted through the strut 18 will not be applied to the hull of the hydrofoil craft. The pivot member 34 is located aft of the king post 20.

The failure load at which the strut 18 will separate from the king post 20 is determined by the materials of construction, the number and minimum cross-sectional area of the tension fasteners 40.

Figure 7:
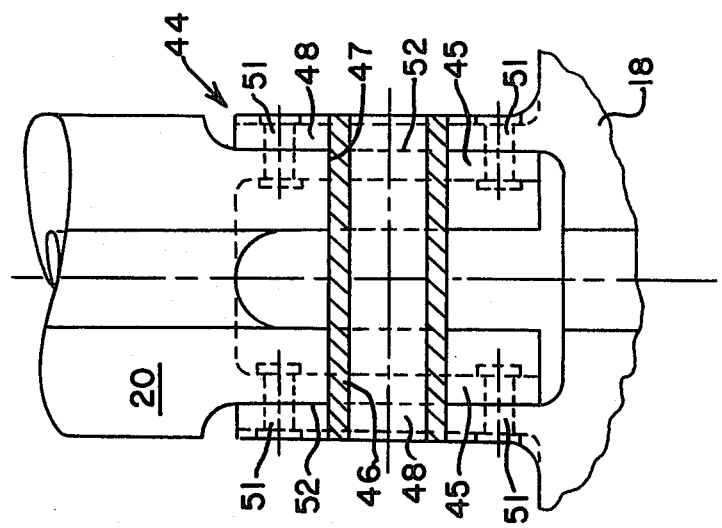
FIG. 7 is a front end view, partly schematic, of the connectoon of FIG. 6 taken along the vertical center line of FIG. 6.
Figure 6:
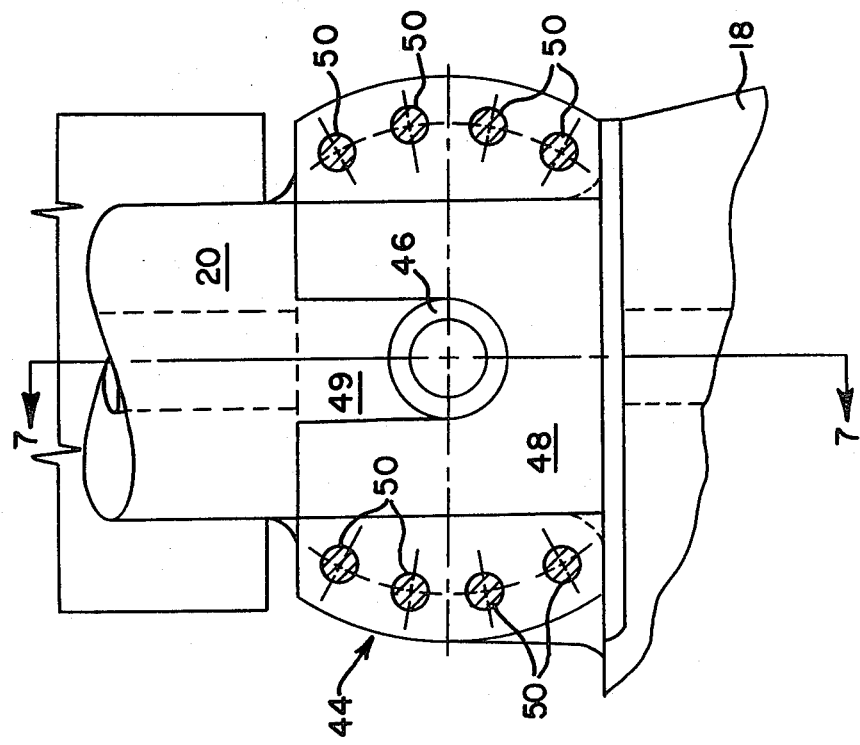
FIG. 6 is an elevation view of another embodiment of the present invention showing a connection between a king post and a strut and foil assembly.

Referring to FIGS. 6 and 7, an improved shear connection means 44 is illustrated. A fork having fork arms 45 extends downwardly from the king post 20 and has a horizontal pivot member 46 which may be solid or tubular extending through an appropriate bore 47 in the fork arms 45. Corresponding fork arms 48 extend upwardly from the strut 18. Each of the fork arms 48 has a "U" shaped groove 48 which engages the pivot member 46. It will be observed that the fork arms 45 correspond with the fork arms 48 and are in surface engagement along abutment planes 52. Aligned bolt holes 50 extend through the engaged fork arms 45, 48. Appropriate connecting bolts 51 are provided in the aligned bolt holes 50 to connect one fork arm 48 and the engaged fork arm 45.

When the strut 18 experiences an impact load, the fork arms 48 are urged to rotate about the pivot member 46 and to shear the connecting bolts 51 which are snugly fitted into the aligned bolt holes 50. When the connecting bolts 51 have sheared, the strut 18 can fall away from the king post 20 and its seperation path will be determined by the pivot member 46. The failure load of the connection of FIG. 7 is determined by the materials of construction of the bolts 51 and by their cross-sectional area along the abutment planes 52 of the fork arms 45, 48.

Figure 9:
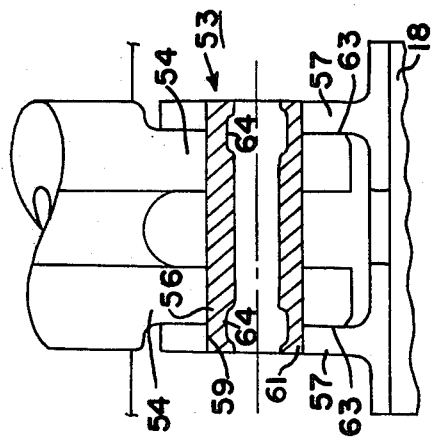
FIG. 9 is a front elevation view of the connection of FIG. 8, taken along the line 9—9 of FIG. 8.
Figure 8:
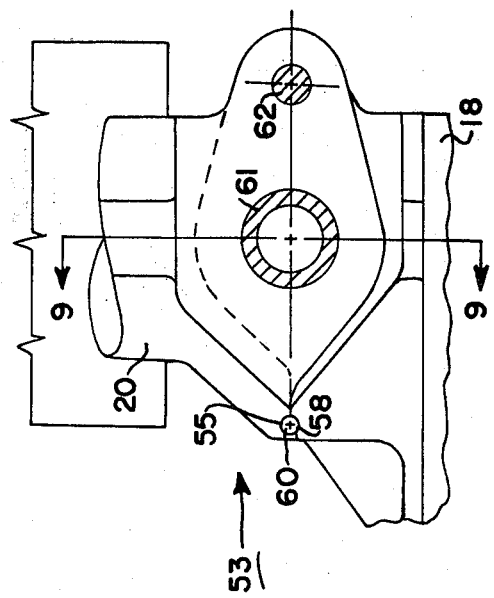
FIG. 8 is a side elevation view, similar to FIG. 6, of a different embodiment of a connectin between a king post and a strut.

Referring to FIGS. 8 and 9, an improved connector means 53 employs an eccentric pivot and shear connectors. The king post 20 has a pair of fork arms 54 which have an arcuate groove 55 at one edge and one or more bores 56 at a selected distance from the arcuate groove 55. The strut 18 has a pair of fork arms 57 which similarly have an arcuate groove 58 and one or more bores 59. An appropriate pivot member 60 is received in the grooves 55, 58 to define a pivot axis. The bores 56, 59 are aligned and receive shear connectors 61, 62. The fork arms 54, 57 engage along an abutment plane 63 through which the shear connectors 61, 62 pass. As shown in FIG. 9, the shear connector 61 may be tubular and have internal grooves 64 to establish the desired thickness of the shear connector 61 at the abutment planes 63. Solid shear connectors as shown at 62 also may be employed.

When the strut 18 experiences an impact load, it tends to rotate about the axis of the pivot member 60 causing the shear connectors 61, 62 to fail in shear. The separated strut 18 will move away from the king post 20 in a path which is established by rotation of the arcuate groove 58 about the pivot member 60.

Figure 11:
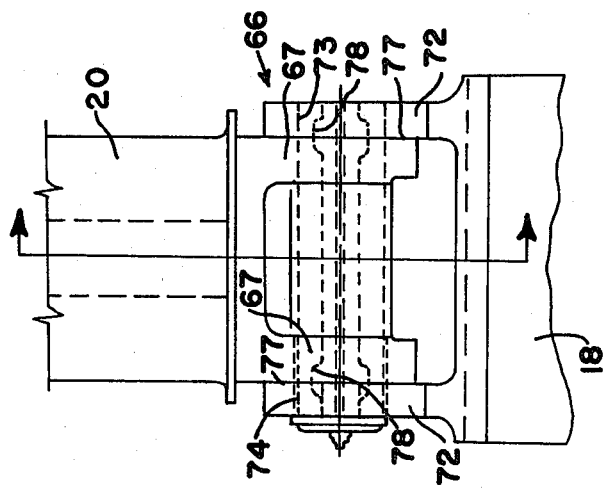
FIG. 11 is an end view of the connection of FIG. 10, taken along the center line of FIG. 10.
Figure 10:
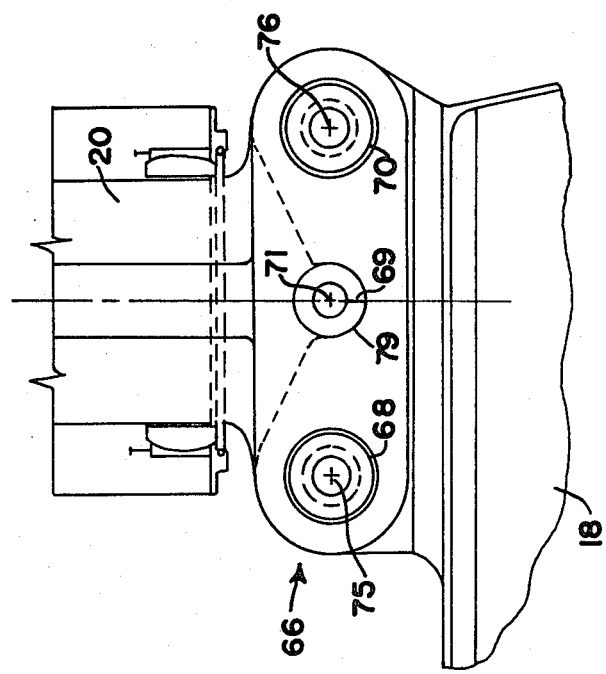
FIG. 10 is another side elevation view of a connection between a king post and a strut similar to FIG. 6.

A further shear connection means 66 is illustrated in FIGS. 10 and 11 wherein the king post 20 has a pair of depending fork arms 67 and three bores 68, 69, 70. The bore 69 receives a pivot member 71. The strut 18 has a pair of upstanding fork arms 72. Each fork arm 72 has a pair of bores 73, 74 which correspond to and are aligned with the bores 68, 70. An appropriate shear connector 75 is introduced into the bores 68, 74 and an appropriate shear connector 76 is introduced into the bores 70, 73. The fork arms 72, 67 are engaged along abutment planes 77. If the shear connectors 75, 76 are tubular as shown in FIG. 11, they may be provided with an internal groove 78 to establish the precise cross-sectional area of material in the shear connector at the abutment plane 77 thereby establishing the desired failure load of the shear connectors 75, 76.

It will be observed that the fork arms 72 have an open upper end which terminates in a "U" shaped groove 79 which engages the pivot member 71. When the strut 18 experiences an impact load, it tends to rotate about the axis of the pivot member 71 and to cause the shear failure of the shear connectors 75, 76. When the connectors 75, 76 fail, the strut 18 will separate from the king post 20 along an arcuate path defined by rotation of the "U" shaped groove 79 about the pivot member 71.

Figure 12:
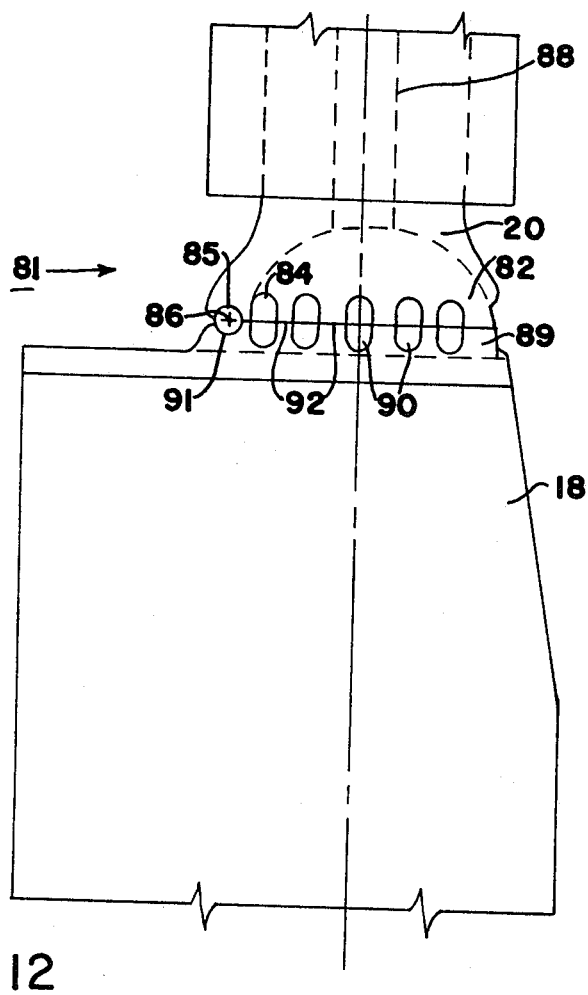
FIG. 12 is a side elevation view of a connection between a king post and strut showing a further alternative embodiment of the present invention.
Figure 13:
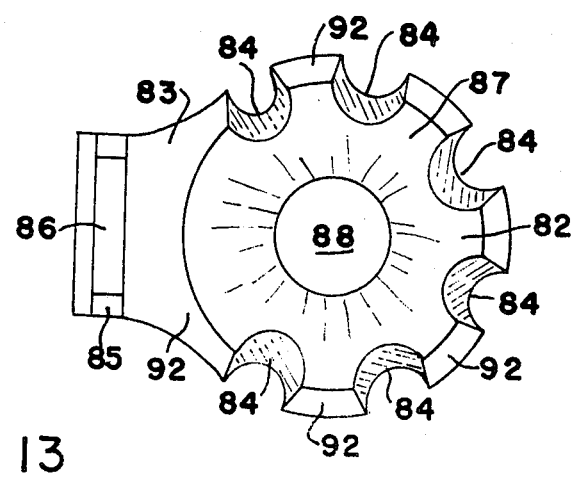
FIG. 13 is a perspective view of a common shaped connector of FIG. 12.

A still further connection means 81 is illustrated in FIG. 12. A crown shaped extension 82 extends from the king post 20. The crown shaped extension 82 is shown in plan view FIG. 13. The crown shaped extension 82 has a rim 83 with plural depressions 84 and an arcuate groove 85 which receives a pivot member 86. The concave inner surface 87 is open and communicates with a hollow shaft 88 within the king post 20.

The upper end of the strut 18 has an upper mounting element 89 corresponding to the crown shaped extension 82 and including arcuate openings 90 and an arcuate groove 91. It will be observed that the crown shaped extension 82 and the mounting element 89 are engaged on common surfaces 92 which can be secured by appropriate welded connections. When the strut 18 experiences an impact load, the welded connections along the abutting surfaces 92 are ruptured as a result of tension failure and the strut 18 separates from the king post 20 along an arcuate path which is defined by pivotal movement of the strut 18 about the axis of the pivot member 86.

I claim:

1. In a hydrofoil craft having a forward, depending pivotal strut and a foil secured to the strut adjacent to the bottom of the strut, a king post connected to the frame of the hydrofoil craft, connection means securing said king post to said strut adjacent to the top of the strut;
   the improvement in said connection means comprising a pivot member separably disposed between said king post and said strut to define a pivot axis;
   frangible connector elements between said king post and said strut for normally retaining said king post and said strut in a rigid, fixed relationship with said pivot member therebetween;
   said frangible connector elements being adapted to rupture when said strut experiences an impact load exceeding a predetermined value;
   said pivot member being separably disposed between the said king post and the said strut such that the strut will pivot about the said pivot member upon rupture of said frangible connection means and the said strut will separate from the said king post downwardly, away from the hull of said hydrofoil craft.

2. The improvement of claim 1 wherein the said pivot member is a solid pin.

3. The improvement of claim 1 wherein the said pivot member is a tube.

4. The improvement of claim 1 wherein the bottom of said king post is a first flange having a bottom surface and the top of said strut is a second flange having a top surface corresponding to the bottom surface of said first flange;
   wherein a pivot member is positioned between said flanges aft of the said king post and defining a pivotal axis which is generally horizontal and generally normal to the longitudinal axis of the craft;
   aligned bolt holes in the said flanges forwardly of said pivotal member;
   said connector elements comprising flange bolts secured in said aligned bolt holes and being adapted to rupture at a predetermined tension load.

5. The improvement of claim 4 wherein the said flanges have aligned clearance holes and a connecting pin is positioned within each said clearance hole to resist lateral stresses applied to the said flange bolts.

6. The improvement of claim 1 wherein said king post has a pair of depending parallel fork arms at its base and a pivot member extends between said fork arms;
   said strut having a pair of upstanding parallel fork arms, each having a U-shaped opening engaging said pivot member;
   said depending fork arms engaging said upstanding fork arms along abutment planes;
   at least one generally horizontal bolt receiving opening in each fork arm displaced from the said pivot member;
   said connector elements comprise shear members being secured in said bolt holes and being adapted to fail in shear when a predetermined stress is applied to said strut tending to cause pivotal movement of said strut about said pivot member;
   whereby said strut member will separate from said king post about said pivot member when said shear members are sheared.

7. The improvement of claim 6 wherein the said shear members are tubular.

8. The improvement of claim 7 wherein the tubular shear members have an internal groove at the intersection of said abutment planes with the shear members.

9. The improvement of claim 6 wherein said pivot member is located aft of the king post and said bolt receiving openings are presented forward of said pivot member.

10. The improvement of claim 6 wherein the said pivot member is located centrally of said fork arms and said shear elements are presented both forward of said pivot member and aft of said pivot member.

11. The improvement of claim 1 wherein said king post has a crown shaped member at its base and said strut has a corresponding crown shaped member at its top, each said crown shaped member having corresponding surfaces, a pivot member secured between the two said surfaces aft of said king post, multiple connections between said surfaces forward of said pivot member, said multiple connections comprising said connector elements.

12. The improvement of claim 11 wherein the said multiple connections are welds adapted to fail in tension when a predetermined stress is applied to said strut tending to cause pivotal movement of said strut about said pivotal member.

13. The improvement of claim 1 wherein the said pivotal strut pivots about a generally horizontal axis from an operating position to a non-operating position and therein the said pivot axis is distinct and spaced from said generally horizontal axis.

* * * * *